United States Patent
Miyoshi et al.

(10) Patent No.: US 9,853,518 B2
(45) Date of Patent: Dec. 26, 2017

(54) CANTILEVERED-SHAFT ELECTRIC MOTOR

(71) Applicant: Hitachi Industrial Equipment Systems Co., Ltd., Chiyoda-ku, Tokyo (JP)

(72) Inventors: Tsutomu Miyoshi, Tokyo (JP); Kenji Yajima, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 742 days.

(21) Appl. No.: 14/372,642

(22) PCT Filed: Dec. 6, 2012

(86) PCT No.: PCT/JP2012/081678
§ 371 (c)(1),
(2) Date: Jul. 16, 2014

(87) PCT Pub. No.: WO2013/108504
PCT Pub. Date: Jul. 25, 2013

(65) Prior Publication Data
US 2015/0097456 A1   Apr. 9, 2015

(30) Foreign Application Priority Data

Jan. 17, 2012   (JP) .................................. 2012-006907

(51) Int. Cl.
*H02K 5/16*   (2006.01)
*H02K 5/10*   (2006.01)
(Continued)

(52) U.S. Cl.
CPC ............... *H02K 5/10* (2013.01); *H02K 7/083* (2013.01); *H02K 7/085* (2013.01); *H02K 15/16* (2013.01); *H02K 2201/03* (2013.01)

(58) Field of Classification Search
CPC ........... H02K 5/10; H02K 7/085; H02K 7/086
(Continued)

(56) References Cited

U.S. PATENT DOCUMENTS 7,839,034 B2 *  11/2010  Czajkowski ........... H02K 21/16
                                                          310/112
2009/0115264 A1   5/2009  Poskie et al.
2012/0228990 A1   9/2012  Kori et al.

FOREIGN PATENT DOCUMENTS

JP       58-46845 A      3/1983
JP       63-182667 U    11/1988
(Continued)

OTHER PUBLICATIONS

Corresponding International Search Report dated Feb. 19, 2013 with English Translation (four (4) pages).
(Continued)

*Primary Examiner* — Hanh Nguyen
(74) *Attorney, Agent, or Firm* — Crowell & Moring LLP

(57) ABSTRACT

This cantilevered-shaft electric motor has no bearing on the load side, and since there also is no end bracket, which is present in ordinary electric motors, the internal stator and rotor are in an unprotected state in a bare state. The present invention provides a cantilevered-shaft electric motor that prevents damage to the stator and rotor during transport, causes handling properties during transport and during coupling to a load side to be favorable, and prevents contaminants from infiltrating. The cantilevered-shaft electric motor is provided with: a stator that is affixed at the inner diameter side of a housing; and a rotor that is rotatably borne disposed facing the inner peripheral side of the stator. The cantilevered-shaft electric motor has a structure such that the rotor is provided with a bearing at the reverse side from the load and the shaft at the load side is supported at an apparatus side. The cantilevered-shaft electric motor is characterized (Continued)

by being provided with a partition plate having a hole through which the rotary shaft penetrates at the load side of the rotor, the partition plate being provided with: a role as an affixing jig that supports the rotary shaft in a manner so that the rotor does not contact the stator during transport; and a role as a protective member that prevents the infiltration of contaminants from the outside.

10 Claims, 5 Drawing Sheets

(51) Int. Cl.
*H02K 7/08* (2006.01)
*H02K 15/16* (2006.01)

(58) Field of Classification Search
USPC .................................................. 310/89, 90
See application file for complete search history.

(56) References Cited

FOREIGN PATENT DOCUMENTS

| | | |
|---|---|---|
| JP | 63-187573 U | 12/1988 |
| JP | 7-274455 A | 10/1995 |
| JP | 9-247890 A | 9/1997 |
| JP | 2007-325426 A | 12/2007 |
| JP | 4463898 B2 | 5/2010 |
| WO | WO 2011/051996 A1 | 5/2011 |

OTHER PUBLICATIONS

Extended European Search Report issued in counterpart European Application No. 12866172.5 dated Mar. 30, 2016 (seven (7) pages).

* cited by examiner

CANTILEVERED-SHAFT ELECTRIC MOTOR

TECHNICAL FIELD

The present invention relates to a structure of an electric motor, and particularly to a cantilevered-shaft electric motor in which a rotary shaft is supported by a bearing on the side opposed to the load in a cantilevered manner.

BACKGROUND ART

Each of FIG. 6 and FIG. 7 shows an example of a conventional cantilevered-shaft electric motor. A housing 1 of the electric motor has a flange on the load side which is fixed to a flange of a device (not shown) on the load side using bolts. The side opposed to the load of a rotary shaft 7 is rotatably supported by a bearing 6, and a connecting plate 8 connected to a load rotary shaft (not shown) is attached to an end of the rotary shaft 7 on the load side. The rotary shaft is supported by a bearing on the load device side (not shown).

The electric motor before being connected to the load is of a cantilevered shaft in which the rotary shaft 7 is supported only by the bearing 6 on the side opposed to the load. The shaft end on the load side that is not supported is inclined, and a rotor 5 is brought into contact with a stator 4.

If the electric motor is transported in this state, the rotor 5 and the stator 4 are brought into contact with each other, and are damaged. Further, the all mass of the rotary shaft is applied to the bearing 6, which is possibly to be damaged.

In FIG. 6 and FIG. 7, in order to prevent these problems, the connecting plate 8 to support the rotary shaft 7 and affixing jigs 11A to fix the connecting plate 8 to the housing 1 are prepared, and the affixing jigs 11A are attached between the connecting plate 8 and the flange of the frame of the housing 1 using fixing bolts 11B and 11C, so that the rotary shaft 7 is prevented from being inclined. Then, the electric motor is transported in this state, and such a state of the electric motor is kept immediately before the electric motor is connected to the load device. When the connecting plate 8 is connected to the load rotary shaft, the affixing jigs 11A are removed.

As described above, if the connection between the electric motor and the load device is completed, the affixing jigs 11A are removed and not needed. Thus, the unnecessary affixing jigs 11A are ideally returned to the manufacturer of the electric motor for reuse.

However, in the case where only the affixing jigs 11A are returned to the manufacturer, there is a possibility of not immediately returned or forgetting to return the affixing jigs 11A. If the affixing jigs are not returned on a timely basis in accordance with the manufacturing at the manufacturer of the electric motor, there occurs a problem that the electric motor cannot be assembled. In order to prevent this, it is necessary to hold excessive affixing jigs in stock, or to prompt the client of the electric motor to return the affixing jigs. Thus, the affixing jigs need to be always managed, leading to increased steps.

Patent Literature 1 to Patent Literature 3 describe conventional techniques of this type. Patent Literature 1 introduces a method in which a cantilevered-shaft electric motor is fixed using a protection device (affixing jig) for transportation. However, although this method is characteristic in the shape of the affixing jig, the affixing jig is needed for the electric motor during transport similarly to FIG. 1. If connection to the load device is completed, a problem of disposal of the affixing jig arises.

Further, Patent Literature 2 discloses an electric motor transportation device in which an elastic holding member is inserted into a gap between the inner circumference of an electric motor housing and the outer circumference of an output-side rotor shaft for transportation, and the elastic holding member is removed when being assembled to an opposing vehicle body. However, a problem of disposal of the elastic holding member arises when being assembled to the opposing vehicle body similarly to Patent Literature 1.

CITATION LIST

Patent Literature

Patent Literature 1: Japanese Patent No. 4463898
Patent Literature 2: Japanese Patent Application Laid-Open No. Hei 07-274455
Patent Literature 3: Japanese Patent Application Laid-Open No. Sho 58-046845

SUMMARY OF INVENTION

Problems that the Invention is to Solve

Further, Patent Literature 3 discloses a rotating electrical machine of a cantilevered bearing structure in which a centering projection is provided so that the center of an outer frame can be recognized without removing a connection-side protection cover when the shaft center of a free rotary shaft is allowed to match the center of the outer frame. However, a support for the rotary shaft used when the rotating electrical machine is transported is not disclosed. If a rotor iron core is brought into contact with a stator iron core, the iron cores and coils are scratched. Further, the mass of the rotary shaft is applied to the cantilevered bearing on the side opposed to the load, and the cantilevered bearing is possibly damaged.

Further, a cantilevered-shaft electric motor has no bearing on the load side, and an end bracket that is provided in a normal electric motor does not exist. Thus, a stator and a rotor therein are not protected, being in a bare state. Thus, moisture or foreign substances possibly enter during a period until being connected to a device on the load side. For example, it is necessary to prevent moisture or foreign substances from entering by covering with a protective material such as vinyl. However, the protective material needs to be removed when being connected to the load device. Thus, there is a possibility that foreign substances enter when being connected to the load device. If foreign substances accidentally enter, the stator is damaged by the foreign substances when the electric motor is rotated, and the electric motor is accordingly burnt and damaged in the worst case. Thus, the reliability of the electric motor is disadvantageously deteriorated when the electric motor is installed.

An object of the present invention is to provide a cantilevered-shaft electric motor in which a stator and a rotor are prevented from being damaged at the time of transportation, which can be easily handled at the time of transportation and being connected to the load side, and in which foreign substances are prevented from entering.

Means for Solving the Problems

In order to achieve the above-described object, the present invention provides a cantilevered-shaft electric motor including: a stator that is fixed on an inner diameter side of a housing; a rotor that is arranged to face the inner circumference side of the stator and that is rotatably borne; and a bearing for a rotary shaft of the rotor on the side opposed to a load, the rotary shaft on the load side being structured to be supported by the device side of the load, wherein a partition plate having a through-hole through which the rotary shaft of the rotor penetrates is provided on the load side of the rotor, and the dimension of the inner diameter of the through-hole of the partition plate is set to satisfy S1≤S2 when a gap between the through-hole of the partition plate and the rotary shaft of the rotor is S1 and a gap between the stator and the rotor is S2.

Further, in the above-described cantilevered-shaft electric motor, the dimension of the inner diameter of the through-hole of the partition plate is set to generate a gap between the inner circumference of the stator and the outer circumference of the rotor in a state where the rotary shaft of the rotor is brought into contact with the inner circumference of the through-hole.

Further, in the above-described cantilevered-shaft electric motor, the rotary shaft of the rotor is stored or transported in a state where the rotary shaft is inclined to be brought into contact with the inner circumference of the through-hole of the partition plate.

Further, in the above-described cantilevered-shaft electric motor, a permanent magnet is mounted on the outer circumference of the rotor to face the inner circumference side of the stator, and the rotary shaft is brought into contact with the inner circumference of the through-hole of the partition plate in a state where the rotor is attracted to the stator by magnetic force.

Advantageous Effects of Invention

According to the present invention, a stator and a rotor can be prevented from being damaged at the time of transportation, it is not necessary to manage a partition plate that is not removed, and the partition plate functions as a protective material for preventing foreign substances from entering. Thus, the electric motor can be easily handled, and the reliability can be improved.

DESCRIPTION OF EMBODIMENTS

Figure 1:
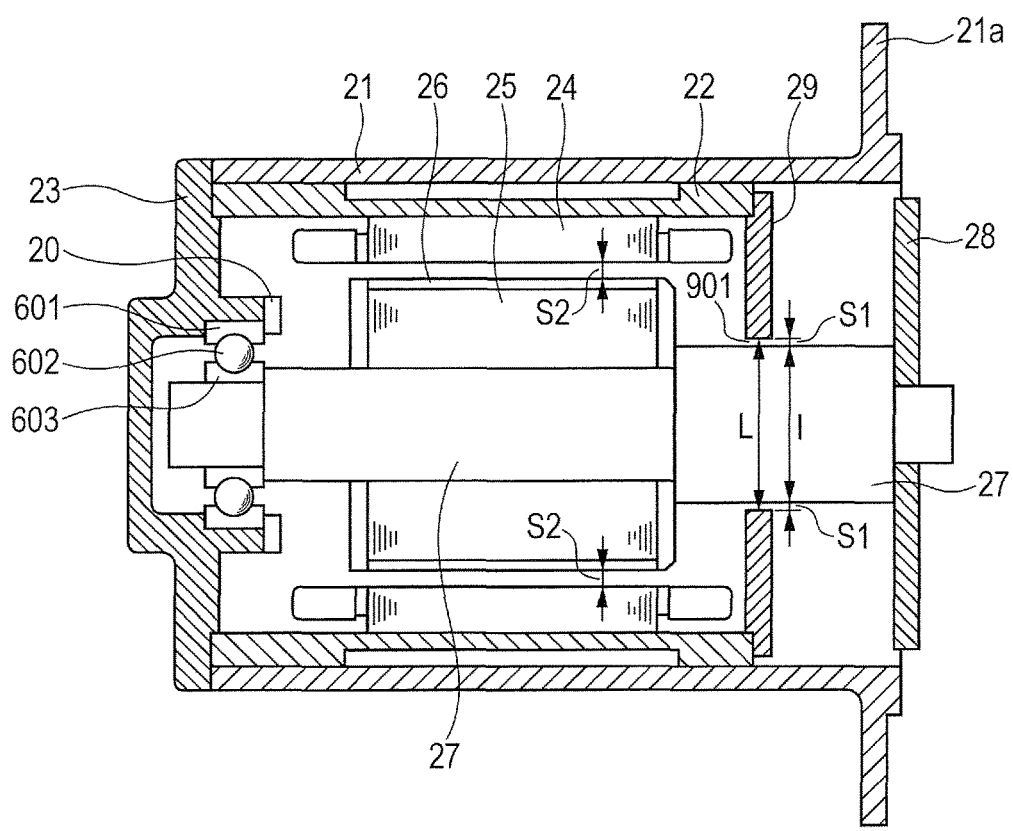
FIG. 1 is a cross-sectional view of an embodiment of the present invention.
Figure 2:
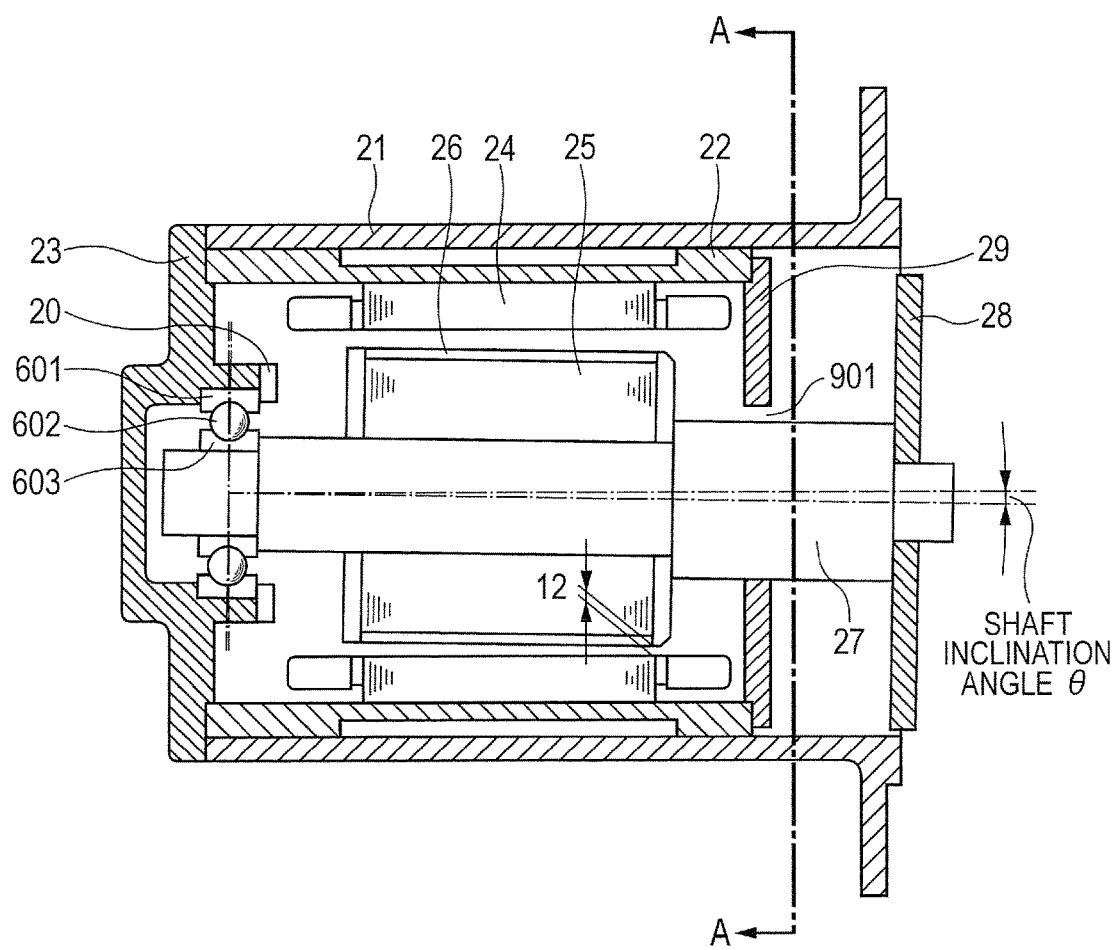
FIG. 2 is a cross-sectional view of the embodiment of the present invention at the time of transportation.

FIG. 1 is a cross-sectional view of a cantilevered-shaft electric motor or a permanent-magnetic synchronous electric motor of an embodiment of the present invention, and FIG. 2 is a cross-sectional view for showing a state in which the electric motor is stored or transported.

The cantilevered-shaft electric motor shown in FIG. 1 includes a stator 24 that is fixed to the inner diameter side of an inner housing 22 of a housing 21, a rotor 25 that is arranged to face the inner circumference side of the stator 24 and that is rotatably borne, and a bearing (ball bearing) 602 for a rotary shaft 27 of the rotor 25 on the side opposed to the load. The rotary shaft 27 on the load side is supported on the device side of the load. A permanent magnet 26 is mounted at the outer circumference of the rotor 25 so as to face the inner circumference side of the stator 24.

The housing 21 of the electric motor has a flange 21a on the load side which is fixed to a flange of a device (not shown) on the load side using bolts (not shown). The rotary shaft 27 of the rotor 25 of the electric motor on the side opposed to the load is rotatably supported by the bearing (ball bearing) 602 provided at an end bracket 23, and a connecting plate 28 that is connected to a load rotary shaft (not shown) is attached to the shaft end of the rotary shaft 7 on the load side. The rotary shaft 27 is supported by a bearing on the load device side (not shown). A bearing outer ring 601, a bearing inner ring 603, and a bearing cover 20 are provided inside and outside the bearing (ball bearing) 602. FIG. 1 shows a state in which the rotary shaft 27 on the side opposed to the load is rotatably supported by the bearing (ball bearing) 602, and the rotary shaft 27 on the load side is connected to the load rotary shaft through the connecting plate 28.

The reference numeral 29 denotes a partition plate that is concentrically fixed to the rotary shaft 27 in the inner housing 22 at a position near the load side of the rotor 25. The partition plate 29 serves to protect the stator 24 and the rotor 25 in the electric motor, and has a through-hole 901 in the middle through which the rotary shaft 27 penetrates and which is larger than the diameter of the rotary shaft 27. The diameter (the dimension of the inner diameter) of the through-hole 901 and the diameter (the dimension of the outer diameter) of the rotary shaft 27 are represented by L and l, respectively.

When a gap between the outer circumference of the rotary shaft 27 and the inner circumference of the through-hole 901 is S1 and a gap between the outer circumference of the stator 22 and the outer circumference of the rotor 25 is S2 in the state of FIG. 2 in which the both sides of the rotor 27 are supported by the bearings, the dimensions of the diameter (the dimension of the inner diameter) L of the through-hole 901 and the diameter (the dimension of the outer diameter) l of the rotary shaft 27 are set so as to satisfy S1≤S2. Further, L, l, and S1 satisfy L=l+2S1.

FIG. 2 shows a state in which the electric motor is stored or transported as described above. In this state, the rotary shaft 27 on the load side is removed from the device side of the load and is not supported. Thus, the rotary shaft 27 is rotated clockwise by its own weight with the bearing (ball bearing) 602 on the side opposed to the load serving as a supporting point, and is inclined only by an angle θ so as to be brought into contact with the lower side of the inner circumference of the through-hole 901 of the partition plate 29. When the rotary shaft 27 is inclined downward, the rotor 25 is inclined together. The outer circumference of the rotor 25 comes close to the inner circumference of the stator 24. When the inclination is increased, the rotor 25 and the stator 24 are brought into contact with each other, and possibly damage each other. In the embodiment, the dimensions of the diameter (the dimension of the inner diameter) L of the through-hole 901 and the diameter (the dimension of the outer diameter) l of the rotary shaft 27 are set, so that a gap 12 is always generated between the inner circumference of the stator 22 and the outer circumference of the rotor 25 in a state where the rotary shaft 27 is brought into contact with the inner circumference of the through-hole 901.

It should be noted that the gap 12 is a gap between a position (a position on the load side) nearest to the load on the outer circumference of the rotor 25 and a position on the load side of the inner circumference of the stator 24 facing the rotor 25.

When the electric motor is stored or transported, the rotary shaft 27 is supported by the bearing 602 on the side opposed to the load and the partition plate 29, and the partition plate 29 is allowed to function as an affixing jig when the electric motor is transported. When the rotary shaft 27 is inclined and is supported by (brought into contact with) the through-hole 901 of the partition plate 29, the permanent magnet of the rotor 25 is attracted by the stator 24. Thus, the rotary shaft 27 is stably supported by the through-hole 901 when the electric motor is stored or transported. A part of the rotary shaft 27 that is brought into contact with the through-hole 901 is slightly oscillated and is possibly scraped when the electric motor is transported. However, the part is not a part supported by the bearing of the load device. Thus, the part causes no problem when the rotary shaft 27 is rotated while being supported by the load.

If the transported electric motor is connected to the load device at an installation area, the rotary shaft 27 is supported between the bearing 602 on the side opposed to the load and a bearing (not shown) on the load device side. Thus, the rotary shaft 27 is separated and lifted from the contact state with the inner circumference plane of the through-hole 901 of the partition plate 29, and can be rotated without being in contact with the through-hole 901 as shown in FIG. 1.

Regarding the partition plate 29, a role as an affixing jig is finished. However, it is not necessary to remove the partition plate 29 even after the electric motor is connected to the load device, and thus the electric motor can be easily handled. Further, the inside of the electric motor is blocked from the outside by the partition plate 29. Thus, there is only a low possibility that moisture or foreign substances from the outside enter the inside of the electric motor including the stator 24 and the rotor 25 during transport or when the electric motor is connected to the load device, and the reliability can be advantageously improved.

Figure 3:
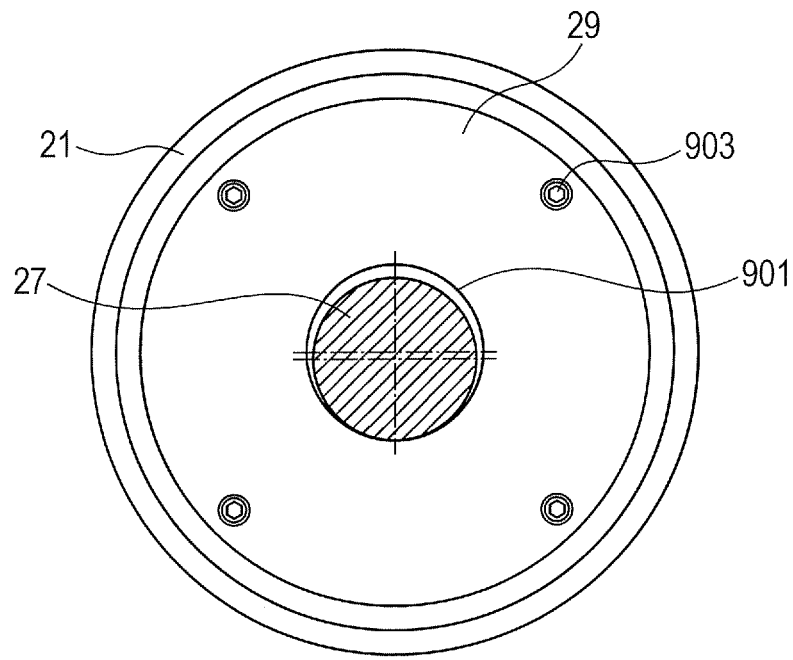
FIG. 3 is an explanatory diagram of a partition plate when viewing FIG. 2 from the cross-section A-A.
Figure 4:
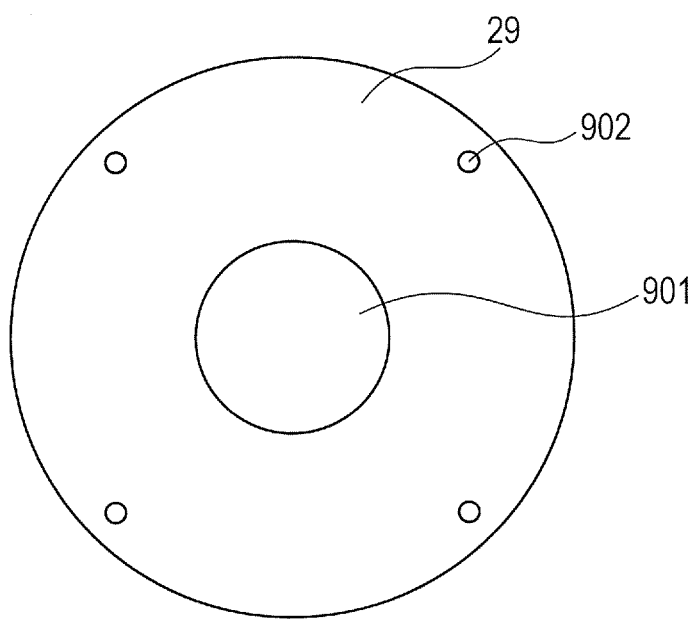
FIG. 4 is a front view of the partition plate alone in FIG. 2
Figure 5:
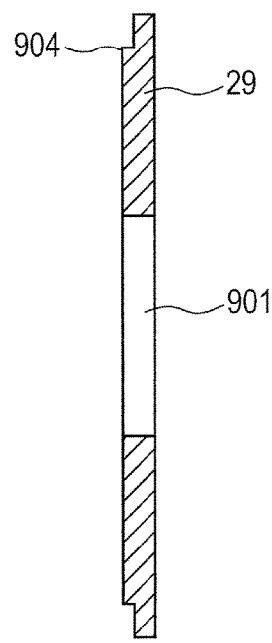
FIG. 5 is a cross-sectional view of the partition plate alone in FIG. 2.
Figure 6:
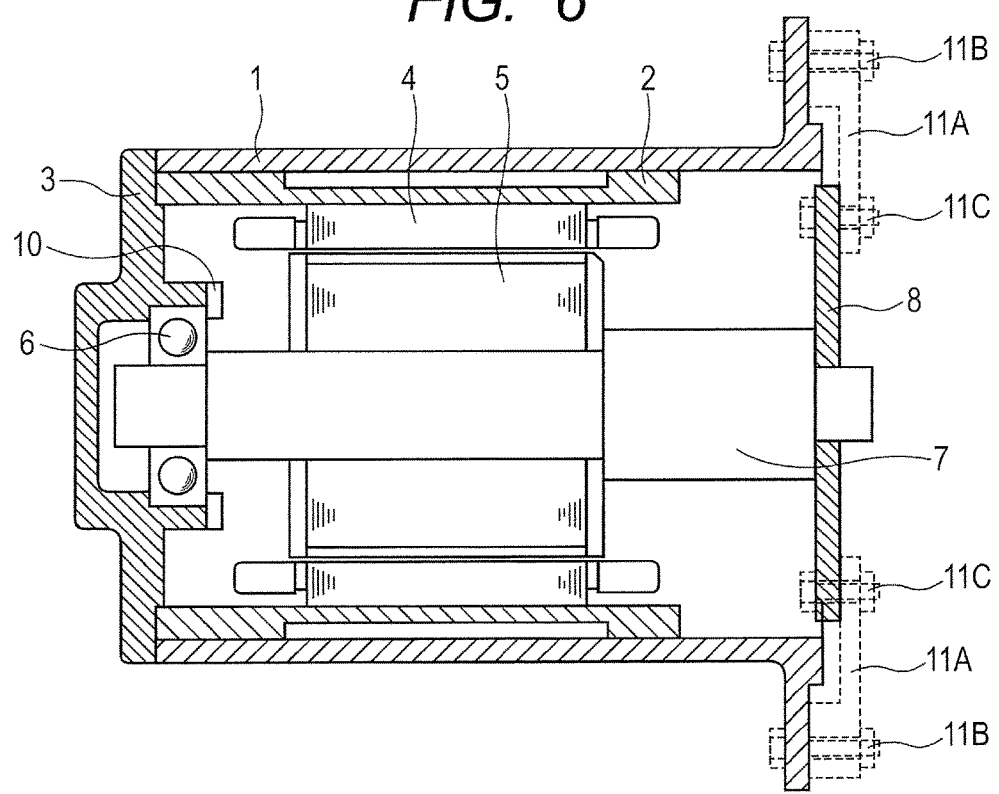
FIG. 6 is a cross-sectional view of a conventional cantilevered-shaft electric motor.
Figure 7:
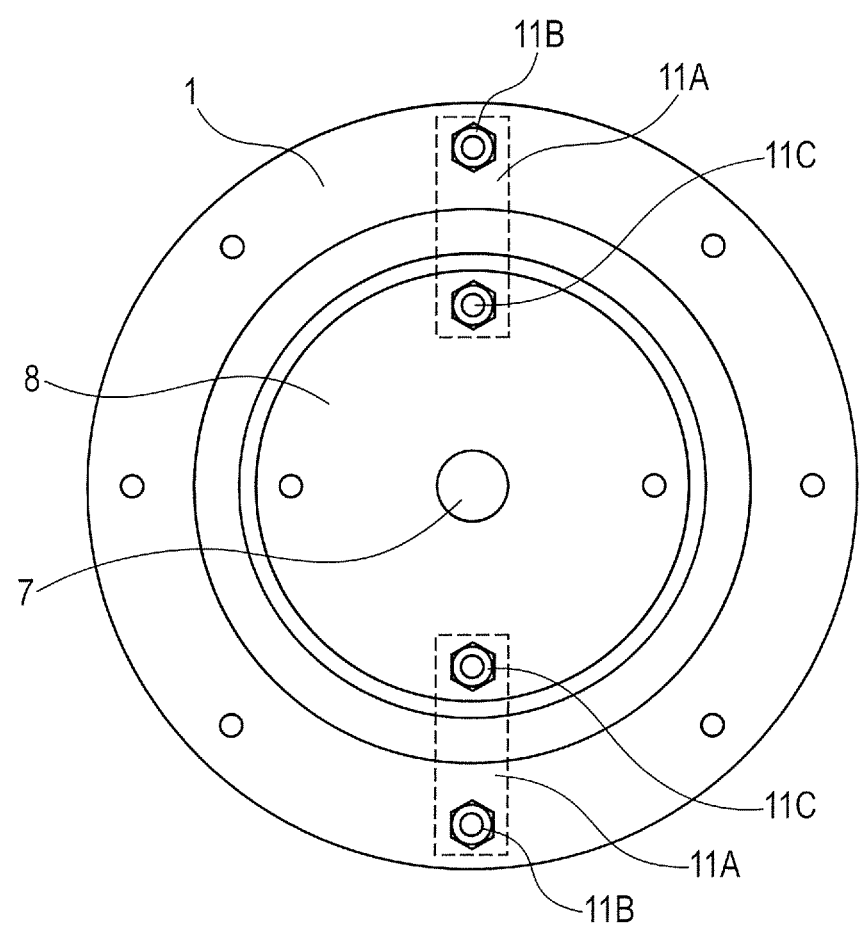
FIG. 7 is a front view when viewing FIG. 6 from the flange side.

FIG. 3 is an explanatory diagram of the partition plate when viewing FIG. 2 from the cross-section A-A, and the outer circumference of the rotary shaft 27 is brought into contact with a lower surface of the inner circumference of the through-hole 901. The reference numeral 903 denotes bolts by which the partition plate 29 is fixed to the inner housing 22. FIG. 4 is a front view of the partition plate alone in FIG. 2, and the reference numeral 902 denotes holes to fix the partition plate 29 to the inner housing 22. FIG. 5 is a cross-sectional view of the partition plate alone in FIG. 2, and the reference numeral 904 denotes steps provided at the partition plate 29 to be engaged with the inner housing 22.

As described above, it is not necessary to remove the affixing jig attached only for transportation, and the affixing jig can be left inside the electric motor. Thus, it is not necessary to manage the affixing jig, and excessive amounts of affixing jigs do not need to be produced. The partition plate functions as a protective material in the electric motor. Thus, the electric motor can be easily handled.

Further, in the case of a conventional cantilevered-shaft electric motor, when the bearing 602 on the side opposed to the load is replaced with another for maintenance, it is necessary to pull the rotary shaft out of the stator after removing the electric motor from the load device once. According to the configuration of the embodiment, the through-hole 901 of the partition plate serves as one supporting point to support the rotary shaft. Thus, if the end bracket 23 on the side opposed to the load is removed while being connected to the load device, the rotary shaft 27 can be supported at two points of the bearing on the load side and the partition plate 29. Thus, the rotary shaft 27 is not largely inclined, and the rotor 25 is not brought into contact with the stator 24.

After the end bracket 23 is removed, the bearing 6 on the side opposed to the load is exposed. Thus, the bearing 602 can be easily removed using a commercially available extracting tool for bearings. A bearing that is newly attached can be attached to the rotary shaft by shrinkage fitting after being warmed using a commercially available heater for bearings. Thus, it is not necessary to remove the rotary shaft, and the replacement is completed when the end bracket 23 is returned to the original position. As described above, the bearing 602 can be replaced with another in a short time without removing the electric motor from the load device and without removing the rotary shaft 27. Thus, the electric motor is advantageously excellent in maintenance.

DESCRIPTION OF REFERENCE NUMERALS

12 . . . gap between inner circumference of stator and outer circumference of rotor, 21 . . . outer housing, 22 . . . inner housing, 23 . . . end bracket, 24 . . . stator, 25 . . . rotor, 26 . . . bearing, 601 . . . bearing outer ring, 602 . . . bearing (ball bearing), 603 . . . bearing inner ring, 27 . . . rotary shaft, 28 . . . connecting plate, 29 . . . partition plate, 901 . . . through-hole, 902 . . . hole to fix partition plate to inner housing using bolt, 903 . . . bolt to fix partition plate to inner housing, 904 . . . step provided at partition plate to be engaged with inner housing, 1 . . . diameter of rotary shaft 27 (dimension of outer diameter), L . . . diameter of through-hole (dimension of inner diameter), S1 . . . gap between through-hole of partition plate and rotary shaft of rotor, S2 . . . gap between stator and rotor

The invention claimed is:

1. A cantilevered-shaft electric motor comprising:
   a stator that is fixed on an inner diameter side of a housing;
   a rotor that is arranged to face the inner circumference side of the stator and that is rotatably borne; and
   a bearing for a rotary shaft of the rotor on the side opposed to a load, a part of the rotary shaft on the load side being structured to be supported by a device side of the load, wherein
   a partition plate having a through-hole through which the rotary shaft of the rotor penetrates is provided between the bearing and a distal end of the rotary shaft, and
   S1≤S2 is satisfied when a gap between the through-hole of the partition plate and the rotary shaft of the rotor is S1 and a gap between the stator and the rotor is S2.

2. The cantilevered-shaft electric motor according to claim 1,
   wherein the dimensions of the diameter of the through-hole and the diameter of the rotary shaft are set to satisfy S1≤S2.

3. The cantilevered-shaft electric motor according to claim 1,
   wherein the dimension of the inner diameter of the through-hole of the partition plate is set to generate a gap between the inner circumference of the stator and the outer circumference of the rotor in a state where the rotary shaft of the rotor is inclined to be brought into contact with the inner circumference of the through-hole.

4. The cantilevered-shaft electric motor according to claim 3,
wherein the gap between the inner circumference of the stator and the outer circumference of the rotor is a gap nearest to the load on the outer circumference of the rotor and the inner circumference of the stator facing the rotor.

5. The cantilevered-shaft electric motor according to claim 4,
wherein the rotary shaft of the rotor is stored or transported in a state where the rotary shaft is inclined to be brought into contact with the inner circumference of the through-hole of the partition plate.

6. The cantilevered-shaft electric motor according to claim 5,
wherein a permanent magnet is mounted on the outer circumference of the rotor to face the inner circumference side of the stator, and the rotary shaft is brought into contact with the inner circumference of the through-hole of the partition plate in a state where the rotor is attracted to the stator by magnetic force.

7. The cantilevered-shaft electric motor according to claim 4,
wherein a permanent magnet is mounted on the outer circumference of the rotor to face the inner circumference side of the stator, and the rotary shaft is brought into contact with the inner circumference of the through-hole of the partition plate in a state where the rotor is attracted to the stator by magnetic force.

8. The cantilevered-shaft electric motor according to claim 3,
wherein the rotary shaft of the rotor is stored or transported in a state where the rotary shaft is inclined to be brought into contact with the inner circumference of the through-hole of the partition plate.

9. The cantilevered-shaft electric motor according to claim 8,
wherein a permanent magnet is mounted on the outer circumference of the rotor to face the inner circumference side of the stator, and the rotary shaft is brought into contact with the inner circumference of the through-hole of the partition plate in a state where the rotor is attracted to the stator by magnetic force.

10. The cantilevered-shaft electric motor according to claim 3,
wherein a permanent magnet is mounted on the outer circumference of the rotor to face the inner circumference side of the stator, and the rotary shaft is brought into contact with the inner circumference of the through-hole of the partition plate in a state where the rotor is attracted to the stator by magnetic force.

* * * * *